United States Patent Office 3,689,334
Patented Sept. 5, 1972

3,689,334
METHOD OF BONDING METAL TO POLYMERS WITH MELT ADHESIVE
William J. Dermody, Titusville, N.J., assignor to ESB Incorporated
No Drawing. Filed Sept. 14, 1970, Ser. No. 72,184
Int. Cl. B32b 31/20, 27/32, 15/08
U.S. Cl. 156—73                                    14 Claims

ABSTRACT OF THE DISCLOSURE

A method is provided for bonding organic polymers such as polypropylene to metals with a hot melt adhesive prepared from an olefinic interpolymer, a carboxylic functional resin capable of fluxing the metal, and a hydrocarbon wax. Techniques of spin-welding using the structural metal adhesive are provided which are particularly effective in sealing and bonding battery terminals to battery cases.

CROSS-REFERENCE TO RELATED APPLICATION

This invention is related to an application filed by James P. Coffey et al. entitled "Battery Terminal Construction and Method for Forming Battery Terminals" which was filed on June 22, 1970 and assigned Ser. No. 47,989, now Pat. No. 3,644,149.

BACKGROUND OF THE INVENTION

This invention may be broadly classified as a method for utilizing a particular hot melt adhesive. This method provides a structural, tough, electrically insulating, chemical resistant seal between metal and organic polymers.

Curable epoxy resins have been used for this type of attachment, however, these thermosetting resins are costly, may be toxic, suffer from a low rate of cure, and are difficult to handle. Pressure sensitive adhesives have been satisfactory for bonding a film to a substrate or film to film lamination but by their tacky nature, they do not offer a structural bond. Rubbery polymers such as polyisobutylene are also used.

Melt adhesives are particularly useful in packaging where high rate of application is desirable. However, these melt adhesives are not structural in character, are not effective in bonding metal to polymers or are not useful in the spin-welding techniques herein described. Hot melt adhesives useful in paper packaging generally utilize high wax content and do not sufficiently flux the metal to provide a structural bond; see U.S. Pat. No. 3,377,305 to A. A. House. Other hot melt adhesives designed for attachment of dissimilar materials are rubbery and do not provide a fluxing action to aid in attachment to metals, such as disclosed in U.S. Pat. No. 3,348,178 to T. P. Flanagan. It is important to retain the carboxylic functionality in the final melt adhesive composition to provide sufficient fluxing. In the spin-welding method of this invention an adhesive of a rubbery nature would not provide the liquid lubrication required of the adhesive during processing. None of these hot melt adhesives offer the combination of processing characteristics, mechanical properties, chemical resistance and adhesion to these particular substrates to make them useful in structural applications in the present invention.

To illustrate the difficulties associated with bonding of metals to organic polymers, the attachment of electrical contacts and terminals to cell or battery cases or separators has been a continuing problem. A leak-proof attachment is desired between the metal battery terminals made from lead or steel and the battery insulators made of cellulosic materials and synthetic polymers or the battery cases prepared from hard rubber or polyolefins. The bonding means between these dissimilar types of materials must provide a tough chemical resistant structural bond that resists changes in temperature without losing its adhesion to both substrates. The bonding means must also not interfere with the attachment of the terminal to the internal metal parts of the battery so that a durable and conductive path may be formed.

There is also great need for means of attaching terminal electrodes to the internal posts of the battery by fast, inexpensive methods. The technique of spin-welding by rotating and forcing the terminal metal post through the battery casing to weld with the internal metal strap has not been entirely satisfactory due to leakage of the fluid electrolyte through the metal/polymer interface around the battery terminal. Unsatisfactory metal to metal welding has also occurred due to interface defects.

The object of this invention is to provide a method of attaching metals to natural and synthetic organic polymers. A further object is to provide a melt adhesive method of attachment for metals to thermoplastic polymers, particularly polyolefins. An additional object is to provide a structural melt adhesive bond with good mechanical properties at room and elevated temperatures, chemical resistance particularly to strong acids and bases found in battery constructions, and permanent adhesion to the substrates. A further object is to provide an economical and efficient method of attaching organic polymers to metals wherein the hot melt adhesive provides a flux to clean the metal without interfering with metal to metal attachment that may be carried out in the same process and providing protection for that metal to metal interface from corrosive failure.

SUMMARY OF THE INVENTION

This invention is a method of adhering a structural metal to an organic polymeric material, by interposing a particular adhesive mixture comprising an olefinic interpolymer such as a copolymer of ethylene and vinyl acetate, a carboxylic functional resin such as rosin, and a hydrocarbon wax such as paraffin, between the surfaces to be bonded. The surfaces are brought into intimate contact with the adhesive composition interposed therein between. At the time the surfaces are brought into intimate contact, the adhesive may already be in the melt condition or energy that will heat the adhesive mixture may be applied after or at the time the surfaces are brought into intimate contact. It is critical that the melted adhesive be in contact with the surfaces to be bonded a sufficient time to wet the surfaces of both the metal and organic polymer materials before the adhesive is allowed to cool in contact with the surfaces to provide a chemical resistant bond. The structural bond obtained with this invention has strengths to 1500 lbs. per square inch with service temperatures to 160° F.

The method by which the melt adhesive is applied to the surfaces to be bonded depends upon the construction of the parts and the type of the substrate materials to be attached. The adhesive may be applied in the melt to both surfaces at essentially the same time. It is preferably applied to at least one surface as a separate step to be later melted in contact with the other surface through the application of energy to melt the adhesive. This energy may be in the form of heat or energy which produces heat to melt the adhesive. The method of this invention is particularly effective with metal battery terminal posts which must be bonded to a polypropylene case to provide a leak-proof seal. The preferred method of this invention is coating at least one of the surfaces of the organic polymer or the metal post with the melt adhesive and spin-welding the metal post through the polyolefin casing. The spin-welding is accomplished by rotating at high speed one of the parts to be bonded, generally the metal post, and pressing it against the other part. The adhesive is interposed between the surfaces to be bonded. The adhesive may be initially located physically on the opposite side of the thermoplastic polymer part if the polymer is to be penetrated as the adhesive will still seal the interface. The friction results in melting both the adhesive and the thermoplastic polymer and soon after the rotating force is terminated the joint cools and hardens to a structural bond. The melt adhesive provides a flux and seal for a bond between the battery casing and the metal post that prevents leakage of the fluid electrolyte such as sulfuric acid. The adhesive facilitates the joining of the metals preventing oily deposits from interfering with metal to metal adhesion and by filling any voids left during the joining to prevent corrosive liquids from propagating the defect. The method of this invention may also be used by heating the battery posts and pressing the heated metal into and through the polypropylene casing on which has been placed a deposit of the melt adhesive composition. Thus, an electroconductive path may be made between the battery post and the internal strap of the battery without leakage problems.

The invention may be further described as a method of bonding structural metals such as lead, zinc or iron to organic polymeric materials such as synthetic thermoplastic polymers like polyolefins by melting an adhesive mixture comprising 10–70% by weight of an olefinic interpolymer of ethylene and 15–50% by weight of at least one comonomer chosen from the group consisting of vinyl alkanoates and acrylic monomers, that is alkyl esters of acrylic and methacrylic acid, such as vinyl acetate, ethyl acrylate, isobutylacrylate, and the like, 25–50% by weight of a carboxylic functional resin capable of fluxing the metal surface to be bonded, such as rosin, and 5–40% by weight of hydrocarbon wax such as paraffin; bringing the metal and the organic polymer substrates into intimate contact with the adhesive mixture sandwiched between the surfaces; contacting the surfaces to be bonded with the adhesive in the melted state until all interfaces are wetted; and allowing the adhesive mixture to cool in contact with the surfaces whereby the metal and the organic polymer are bonded together to form a tough, chemical resistant structural bond.

DESCRIPTION OF THE PREFERRED EMBODIMENTS

The preferred melt adhesive composition useful in the method of this invention comprises 20–50% of an olefinic interpolymer, 30–40% by weight of a carboxylic functional resin, and 20–40% by weight of a hydrocarbon wax. For best results, in bonding thermoplastic organic polymers the melt adhesive should have a softening point lower than that of the thermoplastic polymer.

The class of olefinic interpolymers useful in the invention contain sufficient comonomers with ethylene or propylene to provide improved miscibility and wetting characteristics during processing as well as additional toughness in the final composition. The amount of the comonomers is about 15 to about 50% of the weight of the olefinic interpolymer to reduce the crystallinity of the interpolymer and improve the wetting and compatibility characteristics of the mixture. Common comonomers of this group are vinyl alkanoates and acrylic monomers. Preferably, these comonomers are chosen from the group consisting of vinyl alkanoates wherein the alkane group contains 2 or 3 carbon atoms, and alkyl acrylates and methacrylates wherein the alkyl group contains 1 to 12 carbon atoms, more preferably 1 to 8 carbon atoms. These comonomers include vinyl acetate, vinyl propionate methyl acrylate, ethyl acrylate, n-butyl acrylate, isobutyl acrylate, 2-ethylhexyl acrylate, n-butyl methacrylate, 2-ethylhexyl methacrylate, and the like. Alkyl acrylates, particularly isobutyl acrylate, are preferred. It has been found that the inclusion of the olefinic interpolymer imparts strength, flexibility, toughness and improves adhesion to the metals by compatibility with the other components of the mixture. The melt index of the olefinic interpolymer may vary from 1–400, preferably 5–30. At high melt indexes the adhesive composition is easier to work with, although a slightly lower service temperature is obtained. These polymers are available commercially and may be prepared by methods well known in the art. The copolymerization may be carried out with an organic peroxide under pressure of 20,000 to 25,000 p.s.i. at temperatures from 350 to 450° F.

The second class of compounds in the adhesive mixture is a carboxylic functional resin capable of fluxing the metal. These resins may occur naturally or may be synthetic as long as the resin contains at least one and preferably, a plurality of carboxylic functional groups which aid in wetting the surfaces of the substrate to be bonded, particularly the metal. The natural occurring resins may be generally classified as naval stores and include rosin, tall oil, and tall oil resins. For the purposes of the specification, the term "rosin" includes all rosin derivatives based on abietic acid, such as natural rosin, hydrogenated rosin, dimerized rosin, rosin esters, rosin pitch residues, and other products prepared directly or indirectly from rosin which retain the requisite characteristics. Synthetic resins may be prepared from maleic anhydride, fumaric acid and the like. The preferred carboxylic functional resin is rosin. The carboxylic functional resin is found to act as a wetting agent and non-corrosive flux to improve adhesion to the metals and act as a hydrophobic plasticizer in the mixture.

The third class of compounds in the melt adhesive mixture of this invention is hydrocarbon wax. The waxes are substantially straight chain hydrocarbons of intermediate molecular weight, include crystalline and non-crystalline forms and include low molecular weight polyethylenes. Typical compounded waxes contain minor quantities, commonly less than 25%, of polyethylene, chlorinated paraffin, chlorinated rubbers, polyisobutylene, polyterpene resins, coumarone-indene resins and the like. Also included in the class of "waxes" are functional and substituted waxy compounds such as stearic acid, oleic acid, fatty acid mixtures and the like. Paraffin wax is preferred and as used in this specification includes the compounded paraffin waxes. Typical waxes suitable for use in this invention include those with melting points (ASTM D–87) in the range of 60–85° C. and above and low molecular weight polyethylene with softening points (ASTM E–28) in the range of 95 to 115° C. The inclusion of the wax in the adhesive mixture aids in flow and homogenization of the mixture and is particularly effective in the spin-welding techniques of this invention as a lubricant.

The melt adhesive mixtures may include significant quantities of other materials such as stabilizers, like anti-oxidants, in the polymers or in compounded waxes. Typical anti-oxidant stabilizers include hydroquinone monomethylether, 2,6 ditert-butyl phenol, 1,3,5-trimethyl-2,4,6-tris(3,5-ditert-butyl-4-hydroxy benzyl) benzene and the like. Other compounds that improve the fluxing characteristics of the melt adhesive may be included such as benzoic acid and other functional compounds.

Of the methods of this invention of joining through the melt adhesive the surfaces of the metal and thermoplastic organic polymer substrates, a spin-welded technique is preferred. In this method the melt adhesive of this invention is applied to at least one of the surfaces of the organic polymer and the metal. The organic polymer is commonly polypropylene and the metal is commonly lead or lead alloy. The metal part is rotated at high speed while pressed against the polymer with the melt adhesive interposed between. The spinning metal part presses into or through the organic polymer and may contact and bond to another metal part on the other side. The melt adhesive at the interface between the lead and the thermoplastic polymer provides a flux and lubricant during processing and hardens to a structural bond. The melt adhesive does not interfere with and actually facilitates metal to metal bonding during the same operation. The method of this invention is particularly effective for joining lead or lead alloy battery posts to the internal metal straps of the battery through a polypropylene battery casing to provide a leakproof durable seal. Of particular importance is that the adhesive does not interfere with the lead to lead bonding which is a delicate and critical joint. During the construction of the battery it is sometimes desirable to add additional lead parts in the vicinity of the adhesive seal. These additions may be accomplished by lead burning, resistance welding, spin-welding, and other techniques with the remelted adhesive filling the voids and facilitating the attachment.

An additional method of this invention provides for the application of the melted adhesive to the organic polymer surface, after which it may be cooled. The metal part to be bonded is heated to about 200° C., pressed against the adhesive coating and allowed to cool. This method is again effective with thermoplastic polymers and is particularly effective for attaching battery electrodes to and through a battery casing. A relatively thin web is provided in the thermoplastic polymer casing, commonly made of polypropylene, and a portion of the melt adhesive is applied into a depression provided on the web. The terminal post is heated to about 200° C. and pressed against and through the thin web. The melt adhesive and the thermoplastic polymer are melted and fused to provide a seal between the polypropylene casing and the metal electrode. In the same operation the heated post may join an internal metal strap of the battery. The joint is held firm while the post and the plastics cool. The metal adhesive in the depression is preferably on the same side of the web as the post is pushed through. Later heating of the metal post, such as spin-welding an extension on the post, may remelt the adhesive to provide an additional seal to the added part.

An additional method is to heat the metal part to about 200° C. and dip it into the melted adhesive. The coated metal part is then pressed to the organic polymer and allowed to cool. This technique is effective for cellulosic materials. The joint may be also prepared cold followed by subsequent heating step wherein the polymer, metal and adhesive are all heated to a temperature to melt the adhesive bond.

For realization of highest adhesive strengths the melt adhesive should be completely softened during the bonding procedure. Although in some instances the satisfactory strength can be obtained when the adhesive is heated to only about 150° C., it is generally desirable to provide sufficient heat or energy that produces heat in the adhesive so that the temperature reaches the range of 175° C. to 225° C. The range of 190°–210° C. is preferred. It is generally desirable to warm both surfaces to be joined above the melting point of the adhesive.

The following examples are provided by way of illustration and are in no way intended to limit the scope of the invention. Parts and percentages are by weight. The following abbreviations and test procedures are used in the examples.

E=ethylene
EA=ethyl acrylate
VA=vinyl acrylate
IBA=isobutyl acrylate
BA=n-butyl acrylate
2-EHMA=2-ethylhexyl methacrylate
Melt index=ASTM D–1238
Softening point=ASTM E–28
Vicat=vicat softening point by ASTM D–1525
Congealing point=ASTM D–9838
Melting point=ASTM D–87
Tensile=tensile strength by ASTM D–897

Example 1

The following method is particularly useful for attaching terminal posts to the internal plates of a storage battery while providing a hermetic, chemical resistant seal in one process. A hot melt adhesive is prepared by heating equal parts of natural wood rosin and paraffin wax to about 200° C. An additional part of an ethylene/isobutyl acrylate copolymer (28–32% IBA, melt index 5–6, and vicat 40° C.) is dissolved in the heated mixture. Prior to assembly, the terminal post, a pointed lead alloy ½″ diameter rod, is dipped in the hot melt adhesive which readily coats the surface. The terminal post is positioned above the battery case, which is essentialy a polypropylene sheet about 0.100″ thick and above the internal strap to which the post will be attached. The post is rotated at a speed of approximately 5,000 r.p.m. and pressed downward on the polypropylene sheet with a pressure of approximately 1500 pounds. After about 12 seconds the post is imbedded in the top surface of the battery cover and welded to the internal strap. The melt adhesive provides a permanent seal which resists seepage of sulfuric acid electrolyte. Equally good results are obtained when the melt adhesive is poured into a depression molded into a battery casing and allowed to cool. The spinning post penetrates and melts the adhesive and the casing to form an excellent structural bond.

Example 2

The procedure of Example 1 is repeated except that instead of spin-welding the terminal post through the battery cover, the post is heated to 200° C. and pressed through a thin web in the polypropylene battery cover which has previously been coated with the melt adhesive. The melt adhesive readily wets the polypropylene and adheres to both the lead post and the polypropylene providing a hermetic seal.

Example 3

As an additional illustration of the application of the method of this invention, a silver-zinc alkaline battery is assembled by bonding the active materials to the positive and negative plates onto expanded mesh grids equipped with solid metal tabs to act as electrical terminals for the cell. The cellophane or fibrous sausage casing, which is used as insulation and electrolyte reservoir between the plates, is cut to a size slightly larger than the dimensions of the plates and assembled into a package. The sheets of the separator material are pressed tightly together to prevent adhesive from penetrating between the sheets. The edges of the package are dipped into the same melted adhesive described in Example 1. The melt adhesive hardens to form a bead or frame around the periphery of the separator package. The metal tabs on positive and negative plates are also dipped into the melt adhesive and allowed to cool. When the battery is constructed by assembling the laminar cell packages prepared above, polyethylene sheets are used as insulation between the individual cell packages and the tabs coated with the cooled adhesive are separated to prevent short circuit. Heat sufficient to remelt the adhesive is applied to the assembled packages which provide a hermetic seal to the polyethylene around the periphery of each cell package. The sealant is hydrophobic but has a high affinity for the polyethylene film so that it displaces any electrolyte that is deposited in the seal area if the cell is assembled wet. The cells are connected to form the battery by soldering or welding the tabs through the melt adhesive.

Example 4

To illustrate the adhesion of the melt adhesives to polypropylene tensile adhesion tests on polypropylene buttons are used. Polypropylene buttons having a surface area of one square inch are cleaned and sanded using 120, 180, 320 and 400 grit adhesive paper. The surfaces are cleaned with toluene and air dried at room temperature. Melt adhesives are prepared in proportions shown on Table I from the following components:

poly E/EA (18% EA, melt index 5–7, softening point 153° C.)
paraffin wax (compounded, congealing point 72° C.)
rosin dimerized (softening point 94–96° C.)

For convenience the wax and rosin are melted at about 200° C., after which the copolymer is dissolved in the liquid. The surfaces of the polypropylene test buttons are heated by laying them on a flat aluminum heat sink at 200° C. for 30 seconds. The buttons are removed from the heat sink and each pair is dipped into the melt adhesive just far enough to wet the joint surface. The joint is immediately assembled and set aside to cool. The excess adhesive is trimmed off and the samples are conditioned at 23±2° C. for at least one hour before testing. Tensile strength of the bonds is determined at a constant speed of 0.05" per minute.

TABLE I

| Preparation Number | Composition (parts) | | | Tensile to polypropylene (p.s.i.) |
| --- | --- | --- | --- | --- |
| | Copolymer | Wax | Rosin | |
| 4A | 34 | 33 | 33 | 1,400 |
| 4B | 65 | 10 | 25 | 1,300 |
| 4C | 65 | 5 | 30 | 1,300 |
| 4D | 35 | 20 | 45 | 1,200 |
| 4E | 20 | 35 | 45 | 1,200 |
| 4F | 45 | 10 | 45 | 1,200 |
| 4G | 35 | 40 | 25 | 1,500 |
| 4H | 51 | 22 | 27 | 1,400 |
| 4J | 100 | 0 | 0 | 700–1,100 |
| 4K | 67 | 33 | 0 | 1,000 |
| 4L | 33 | 0 | 67 | 1,000 |

Example 5

To illustrate the effect of substituting other components within the class of compounds in the preparation of melt adhesive, Example 4 is repeated except that the follow-melt is prepared in equal parts of:

poly E/VA (20% VA, melt index 28, softening point 113° C.)
wax (compounded paraffin with polyethylene, softening point 109° C.)
rosin (hydrogenated, softening point 69° C.)

The melt adhesive has good handling characteristics and easily wets out the polypropylene. After only one hour set, the tensile bond between the polypropylene buttons is about 1500 p.s.i. and is tough.

Good results are obtained when the following polymers are substituted for the copolymer in the formulation above:

Poly E/EA (30%) with melt index 2–3 and vicat 41° C.
Poly E/BA (25%)
Poly E/EA/BA (15%/10% respectively)
Poly E/2-EHMA (25%)
Poly E/VA (28%) with melt index 350, and softening point 82° C.
Poly E/VA (41%) with melt index 45–65 and softening point 93° C.
Poly E/VA (28%) with melt index 5–6 (vicat 40° C.)

In general those polymers with higher melt index provide easier handling in the melt stage allowing the adhesive to be applied at a lower temperature.

Good results are obtained when the following materials are substituted in the above formulations for the compounded wax:

Paraffin petroleum wax with melting point 65–85° C.
Microcrystalline paraffin wax with melting point 80° C. (ASTM D–127)
Compounded paraffin wax with congealing point 65–75° C. (ASTM D–938)
Low molecular weight polyethylene with softening point 100–115° C.
Stearic acid/paraffin mix (10/90)

In general the unmodified paraffin wax with a melting point in the range of 65 to 75° C. provides the best handling and physical properties.

Good results are obtained when the following resinous materials are substituted for the hydrogenated rosin in the formulations above:

Natural rosin
Partially dimerized rosin with softening point 95° C.
Hydrogenated rosin, pentaerythritol ester
Hydrogenated rosin, glycerol ester
Phenolic acid/rosin pitch (60%/20%/14% other) residue from pine wood
Tall oil resin Good adhesion is obtained to various grades of polyethylene, polystyrene, styrene copolymers, polymethyl methacrylate, polyvinyl chloride, tetrafluoroethylene, various stainless steels, aluminum, copper, lead alloys, nickel and silver, and others.

Example 6

To demonstrate the adhesive characteristics of the melt adhesives useful in the method of this invention, the following melt was prepared at 200° C. using equal parts of the following components:

Poly E/IBA (28–32%) with a melt index 2–3 and a vicat of 38° C.
Paraffin wax with a melting point of 71° C.
Dimerized rosin with a melting point of 70° C.

Lap shear specimens were prepared by heating one inch wide metal strips to 200° C. and dipping them into the melt adhesive held at 200° C. The lap joints were assembled immediately and allowed to cool undisturbed without pressure. For comparison purposes a group of four typical commercially available epoxy resins recommended as adhesives by the manufacturers were used to prepare the same type lap joints and were allowed to cure and set at room temperature for one week. The results of the tensile tests are provided in Table II with a variety of metal surfaces:

TABLE II

| | | Lap sheer adhesion to metal (pounds) | |
| --- | --- | --- | --- |
| Example | Metal bonded | For adhesive of Ex. 6 | For typical commercial epoxy resins |
| 6A | 2.8% antimonial lead alloy | 340 | 250–330 |
| 6B | 0.05% calcium lead alloy | 300 | 150–200 |
| 6C | 0.44% tin, 0.05% calcium lead alloy. | 400 | 140–250 |
| 6D | Nickel plated steel | 1,200 | 460–1,500 |
| 6E | Silver plated steel | 1,050 | 580–1,400 |

The results of the Table II demonstrate the excellent adhesion obtained with the melt adhesives as compared to commercial epoxy resins designed for high adhesive quality. The consistent results for the melt adhesive are generally superior to that of these average commercial epoxy resins. Further, the melt adhesives provide a strong bond within an hour as compared to the long term cure time required for the epoxy resins.

I claim:

1. A method for bonding metal to organic polymeric materials comprising bringing surfaces a structural metal and a polyolefin material into intimate contact with an adhesive interposed between the surfaces, the adhesive comprising
   (i) 10 to 70% by weight of a composition consisting essentially of an olefinic interpolymer of a monomer chosen from ethylene or propylene and 15 to 50% by weight of at least one comonomer chosen from the group consisting of vinyl alkanoates and alkyl esters of acrylic and methacrylic acid,
(ii) 25 to 50% by weight of a carboxylic functional resin capable of fluxing the metal surface, and
(iii) 5 to 40% by weight hydrocarbon wax, heating the adhesive mixture to a melt condition to wet the surfaces of the metal and the polyolefin material, and allowing the adhesive mixture to cool in contact with the surfaces whereby the metal and polyolefin surfaces are bonded together.

2. The method of claim 1 wherein the adhesive mixture is interposed between the metal and polyolefin surfaces by first melting the adhesive mixture, applying it to at least one of the surfaces, and allowing it to cool before the surfaces are contacted.

3. The method of claim 1 wherein the polyolefin material is polypropylene.

4. The method of claim 1 wherein the melting of the adhesive mixture in contact with the surfaces to be bonded is accomplished by:
rotating and pressing the surfaces to be bonded together with the adhesive mixture interposed therein between with sufficient speed and force to generate through friction sufficient heat to melt the adhesive composition, terminating the rotating force and allowing the adhesive to cool whereby the surfaces are bonded together.

5. The method of claim 4 wherein the energy applied to melt the adhesive mixture is sufficient to melt the surface of the polyolefin material.

6. The method of claim 4 wherein the olefinic polymer component (i) of the adhesive is a copolymer of ethylene and 15 to 50% by weight of a comonomer chosen from the group consisting of vinyl alkanoates, wherein the alkane group contains two to three carbon atoms, and alkyl esters of acrylic and methacrylic acid wherein the alkyl group contains one to twelve carbon atoms.

7. The method of claim 6 wherein the carboxylic functional resin (ii) is rosin.

8. The method of claim 6 wherein the hydrocarbon wax (iii) is paraffin wax.

9. The method of claim 6 wherein the comonomer is an alkyl ester of acrylic acid wherein the alkyl group contains one to eight carbon atoms.

10. The method of claim 9 wherein the comonomer is isobutyl acrylate.

11. The method of claim 1 wherein the adhesive mixture comprises:
(i) 20 to 50% by weight of an olefinic interpolymer of a monomer chosen from ethylene or propylene and 15 to 50% by weight of a comonomer chosen from the group consisting of vinyl alkanoates, wherein the alkane group contains two to three carbon atoms, and alkyl esters of acrylic acid, wherein the alkyl group contains one to eight carbon atoms,
(ii) 30 to 40% by weight rosin, and
(iii) 20 to 40% by weight paraffin wax.

12. The method of claim 11 wherein the materials to be bonded are polypropylene and lead or lead alloy.

13. The method of claim 12 wherein the surfaces to be bonded are brought into intimate contact with the adhesive mixture sandwiched therein between by first applying the adhesive mixture in the melted state to at least one of the surfaces to be bonded and allowing the melted adhesive to cool, and the subsequent melting of the adhesive while in contact with both of the surfaces to be bonded is accomplished by rotating and pressing the surfaces together with the adhesive interposed therein between with sufficient speed and force to create frictional energy to remelt the adhesive composition and stopping the rotation to allow the adhesive to cool whereby the parts are bonded together.

14. The method of claim 13 wherein the comonomer of interpolymer (i) is chosen from the group consisting of vinyl acetate, ethyl acrylate, and isobutyl acrylate.

References Cited
UNITED STATES PATENTS

| | | | |
|---|---|---|---|
| 2,942,748 | 6/1960 | Anderson | 156—73 X |
| 3,049,455 | 8/1962 | Werkman et al. | 161—218 |
| 3,294,722 | 12/1966 | Apikos et al. | 161—218 X |
| 3,438,825 | 4/1969 | Fidler | 156—73 |
| 3,448,178 | 6/1969 | Flanagan | 161—218 X |
| 3,488,252 | 1/1970 | Lamar | 161—213 |

HAROLD ANSHER, Primary Examiner

U.S. Cl. X.R.

156—326, 332, 334; 161—213, 218, 252, 254